(12) United States Patent
Kamara et al.

(10) Patent No.: US 7,669,862 B2
(45) Date of Patent: Mar. 2, 2010

(54) FOLDABLE SPIDER WHEEL FOR ASCENDING AND DESCENDING STAIRS

(75) Inventors: Steven Kamara, Princeton, NJ (US); Michael Yang, Princeton, NJ (US); David Follette, Princeton, NJ (US)

(73) Assignee: SterraClimb LLC, Princeton, NJ (US)

( * ) Notice: Subject to any disclaimer, the term of this patent is extended or adjusted under 35 U.S.C. 154(b) by 151 days.

(21) Appl. No.: 11/796,381

(22) Filed: Apr. 27, 2007

(65) Prior Publication Data

US 2008/0265529 A1 Oct. 30, 2008

(51) Int. Cl.
*B62B 5/02* (2006.01)
(52) U.S. Cl. .................. 280/5.26; 180/8.1; 180/8.2
(58) Field of Classification Search ............... 280/5.26, 280/5.2; 180/8.1, 8.2
See application file for complete search history.

(56) References Cited

U.S. PATENT DOCUMENTS

| | | | |
|---|---|---|---|
| 2,742,973 A | 4/1956 | Johannesen | |
| 2,931,449 A | 4/1960 | King | |
| 3,058,754 A | 10/1962 | Whitaker | |
| 3,241,848 A | 3/1966 | Flory | |
| 3,450,219 A * | 6/1969 | Fleming | 180/8.2 |
| 3,497,227 A * | 2/1970 | Porcello | 280/5.26 |
| 3,515,401 A | 6/1970 | Gross | |
| 3,580,344 A | 5/1971 | Floyd | |
| 3,920,255 A * | 11/1975 | Siddoway | 280/5.26 |
| 4,047,724 A | 9/1977 | Shaffer | |
| 4,109,740 A | 8/1978 | Andruchiw | |
| 4,142,732 A * | 3/1979 | Boyd | 280/5.26 |
| 4,264,082 A * | 4/1981 | Fouchey, Jr. | 280/5.26 |
| 4,521,030 A | 6/1985 | Vance | |
| 4,570,953 A | 2/1986 | McPeak et al. | |
| 4,632,412 A | 12/1986 | Nasgowitz | |
| 4,645,222 A * | 2/1987 | Hester | 280/5.26 |
| 4,687,213 A * | 8/1987 | Ridderstolpe | 280/5.26 |
| 4,709,772 A | 12/1987 | Brunet | |
| 5,052,237 A | 10/1991 | Reimann | |
| 5,160,154 A | 11/1992 | Seydel et al. | |

(Continued)

FOREIGN PATENT DOCUMENTS

CA 877732 8/1971

(Continued)

OTHER PUBLICATIONS

International Search Report, dated Jul. 7, 2008, issued in corresponding International Application No. PCT/ US2008/001870.

(Continued)

*Primary Examiner*—Lesley Morris
*Assistant Examiner*—Michael R Stabley
(74) *Attorney, Agent, or Firm*—Saul Ewing LLP

(57) ABSTRACT

A collapsible spider wheel assembly on a towing device enables storage of the device into a standard rectangular space. Once collapsed, the collapsible spider assembly is protected within the body of the towing device. Furthermore, actuation of the folding and unfolding may be accomplished through the usual telescoping of the carrying handle of such a device, such as in a suitcase embodiment. While the spider wheels are in the open position, the carrying apparatus may exert a drive force to climb up stairs and braking force to descend stairs. The unit operates as a normal wheeled carrying apparatus while traversing a horizontal surface.

11 Claims, 21 Drawing Sheets

U.S. PATENT DOCUMENTS

| | | | |
|---|---|---|---|
| 5,263,727 A * | 11/1993 | Libit et al. ................... 280/40 |
| 5,273,296 A | 12/1993 | Lepek |
| 5,419,569 A | 5/1995 | Walla |
| 5,427,394 A | 6/1995 | Lauto |
| 5,464,104 A | 11/1995 | McArthur |
| 5,527,102 A | 6/1996 | Grossardt et al. |
| 5,549,317 A | 8/1996 | Dunkle |
| 5,595,395 A | 1/1997 | Wilson |
| 5,626,352 A | 5/1997 | Grace |
| 5,641,030 A | 6/1997 | Toselli |
| 5,641,170 A | 6/1997 | Helm |
| 5,701,965 A | 12/1997 | Kamen et al. |
| 5,791,425 A | 8/1998 | Kamen et al. |
| 5,971,091 A | 10/1999 | Kamen et al. |
| 6,336,642 B1 | 1/2002 | Carstens |
| 6,341,784 B1 | 1/2002 | Carstens |
| 6,398,235 B1 | 6/2002 | Cary |
| 6,443,250 B1 | 9/2002 | Kamen et al. |
| 6,454,281 B1 | 9/2002 | Pearson |
| 6,484,829 B1 | 11/2002 | Cox |
| 6,543,564 B1 | 4/2003 | Kamen et al. |
| 6,644,675 B2 | 11/2003 | Ellis et al. |
| 6,752,400 B2 | 6/2004 | Nakatsukasa et al. |
| 6,799,649 B2 | 10/2004 | Kamen et al. |
| 6,899,347 B2 | 5/2005 | Neal et al. |
| 6,929,080 B2 | 8/2005 | Kamen et al. |
| 6,932,363 B2 | 8/2005 | D'Angelo |
| 6,938,740 B2 | 9/2005 | Gandy |
| 7,063,339 B2 | 6/2006 | Jarko et al. |
| 7,168,713 B2 * | 1/2007 | Udall et al. ............... 280/47.26 |
| 2003/0146589 A1 | 8/2003 | Jarko et al. |

FOREIGN PATENT DOCUMENTS

| | | |
|---|---|---|
| DE | 3242880 | 6/1983 |
| DE | 19912932 | 8/2000 |
| GB | 2 139 576 | 11/1984 |
| JP | 5097075 | 4/1993 |
| JP | 6055901 | 3/1994 |
| WO | 86/00587 | 1/1986 |
| WO | 86/05752 | 10/1986 |
| WO | 2006/045107 | 4/2006 |

OTHER PUBLICATIONS

International Search Report issued in related International Application No. PCT/US2006/07927.

Supplementary European Search Report, dated Jul. 7, 2009, issued in related European Application No. EP 06 73 7142.

* cited by examiner

| A (dist from 40 to hinge on 34 and 32) | B (dist from hinge on 34 and 32 to hinge on 34 and 36) | C (radial height where 36 hinges to 38A-F) | D (length of 36) | Dist. 38A-F travels along 40 to open/close assembly | theta | suboptimal gap (45°-theta) |
|---|---|---|---|---|---|---|
| 1.2 | 0.5 | -0.9 | 0.8 | 1.24 | 22.0 | 22.98 |
| 1.2 | 0.5 | -0.5 | 1.2 | 1.47 | 35.7 | 9.31 |
| 1.25 | 0.5 | -0.5 | 1.25 | 1.50 | 36.9 | 8.13 |
| 1.2 | 0.4 | 0 | 1.6 | 1.46 | 48.6 | -3.59 |
| 1.2 | 0.5 | 0 | 1.7 | 1.70 | 44.9 | 0.10 |
| 1.2 | 0.7 | 0.2 | 2.1 | 2.27 | 41.8 | 3.19 |

FIG. 12

FOLDABLE SPIDER WHEEL FOR ASCENDING AND DESCENDING STAIRS

BACKGROUND OF THE INVENTION

1. Field of the Invention

This invention relates to devices for ascending stairwells that employ a "cluster," "X," "Y," "spider," or "wheel-over-wheel" assembly.

2. Description of the Related Art

Towing items such as suitcases and luggage have limited facilities when traversing stairwells. While ascending/descending stairwells, the owner of the towing device has to lift it up and over the corner of each step rendering the wheels useless in this situation. This also leads to a jerking motion as the towing device hops from stair to stair.

Conventional luggage has shown the inclusion of skids on the back of the suitcase panel to ease the suitcase sliding up the stairs. However, these skids typically wear down with use, and not as frictionless as they need to be. Conveyor belts have been proposed: U.S Published Application No. 20040094378 describes a motorized suitcase with brake that utilizes tank treads and rollers. Conveyor belts generally lack adequate grip on stairwells for personal suitcases since the unit may only be in contact with the leading edges of 2-3 stairs at most. Such units must lay flat along the stairs and be heavy enough to create a downward force for the tank treads to effectively grip the stairs and require an overly-lengthy handle for proper use.

Other devices that employ "spider wheels," "cluster wheels," or "wheel over wheel," mechanisms for stair climbing are known. Such devices utilize small, freely-rotating wheels fastened at the ends of spokes that rotate all together as a rigid assembly. PCT Patent Publication No. WO8600587A1 describes a stair-climbing hand truck utilizing rotating spider wheels. Spider wheel assemblies, however, protrude from the main body of a towing device, reducing overall portability.

U.S. Pat. No. 6,484,829, a battery powered stair-climbing wheelchair utilizing two sets of wheel-over-wheel assemblies is described. In that particular vehicle, however, the design addresses mechanisms that controls pitch and attitude adjustment for complete support, orientation, and self-propulsion of human beings up and down stairwells. The preferred embodiment of that vehicle does not include any means of rendering the cluster wheel foldable or collapsible for portability.

This invention introduces a collapsible spider wheel assembly, rendering the towing device to which it is attached, portable for transport. Such towing devices may include but is not limited to: suitcases, hand trucks, and baby strollers.

SUMMARY OF THE INVENTION

Briefly described, the invention comprises a collapsible spider assembly that is coupled to an end of a driveshaft of a towing device. The collapsible spider assemblies are folded in and out by the user pushing/pulling the telescoping handle via a lever system. The central driveshaft may rotate freely, even when the spider assembly remains locked in its open position. In the locked open position, the spider wheel may operate in a conventional manner, facilitating ascent and descent of stairwells. The invention may be more fully understood by reference to the following drawings.

The invention will be more fully described by reference to the following drawings.

BRIEF DESCRIPTION OF THE DRAWINGS

FIG. 12 is a table of geometrical calculations of the lengths listed in FIG. 10 and FIG. 11.

DETAILED DESCRIPTION

Figure 1:
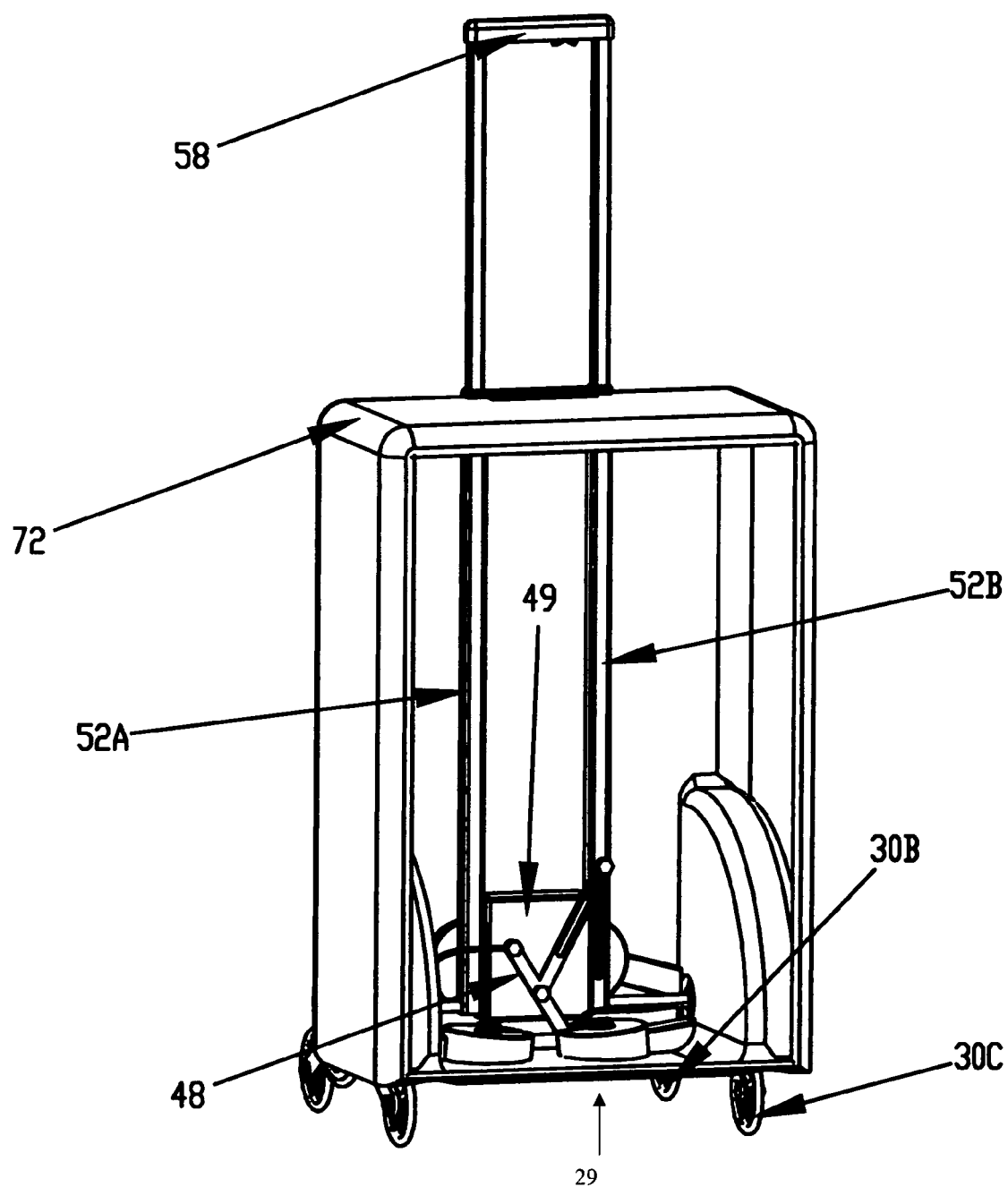
FIG. 1 is an isometric view of a suitcase employing the collapsible spider assembly.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
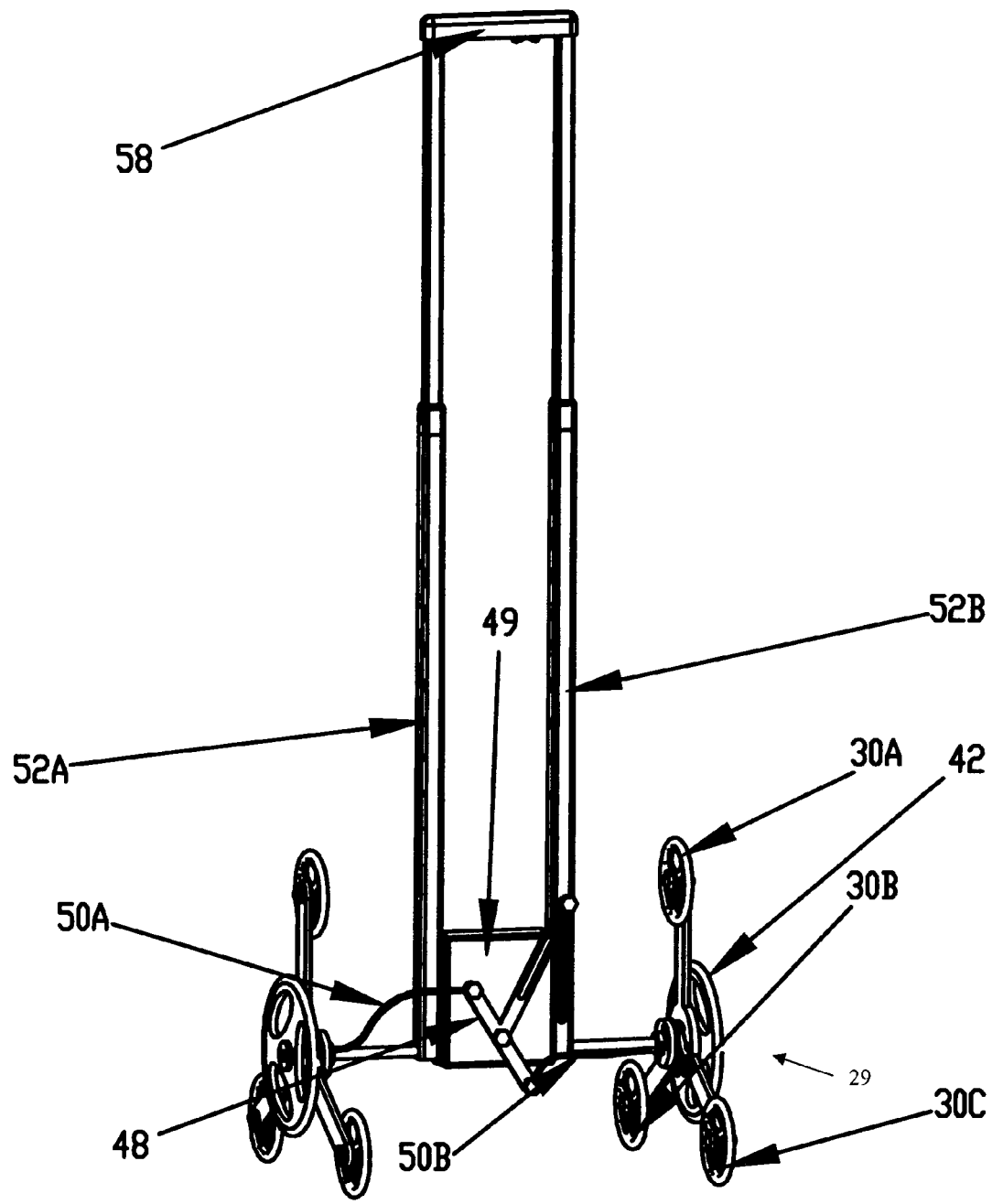
FIG. 2 is an isometric view of the suitcase apparatus being configured for level travel with item #72, protective shell, hidden from view.
Figure 3:
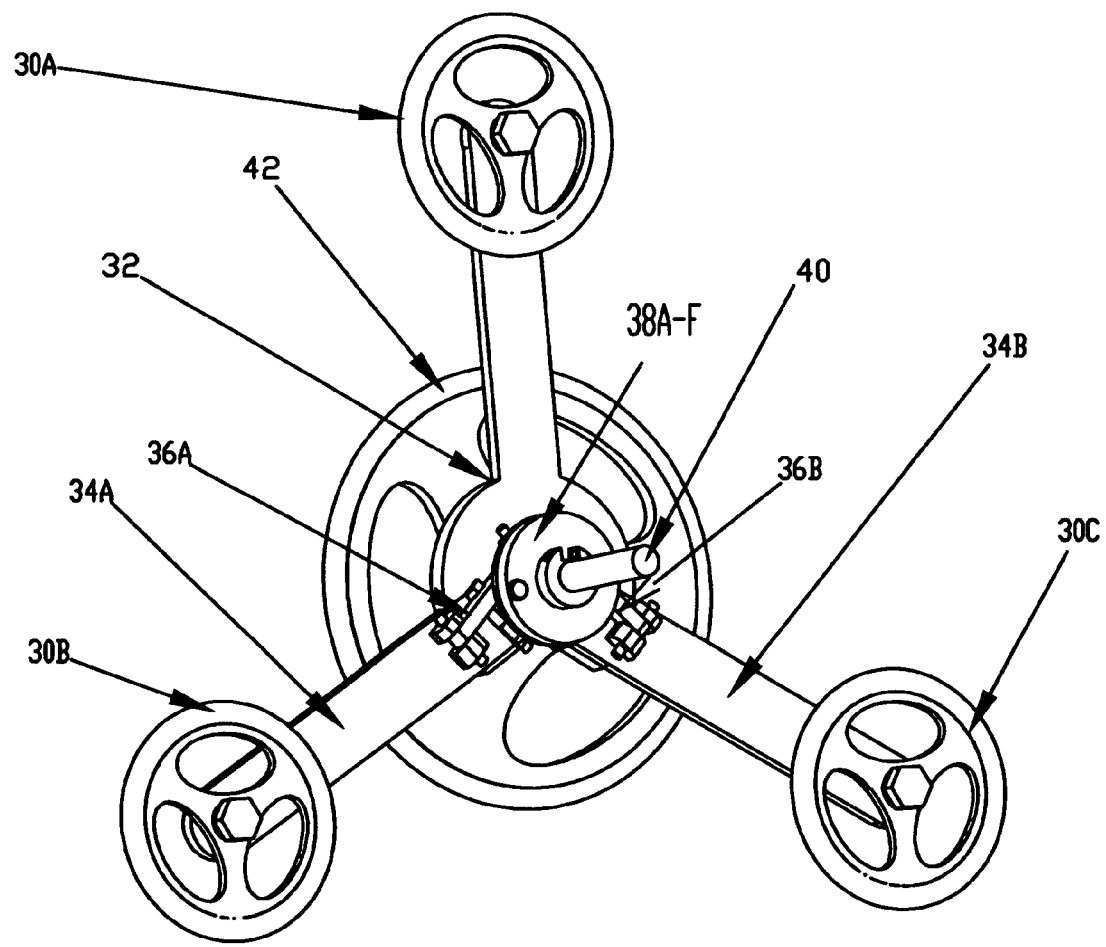
FIG. 3 is an isometric view of the foldable spider wheel apparatus being configured for an open position.
Figure 4:
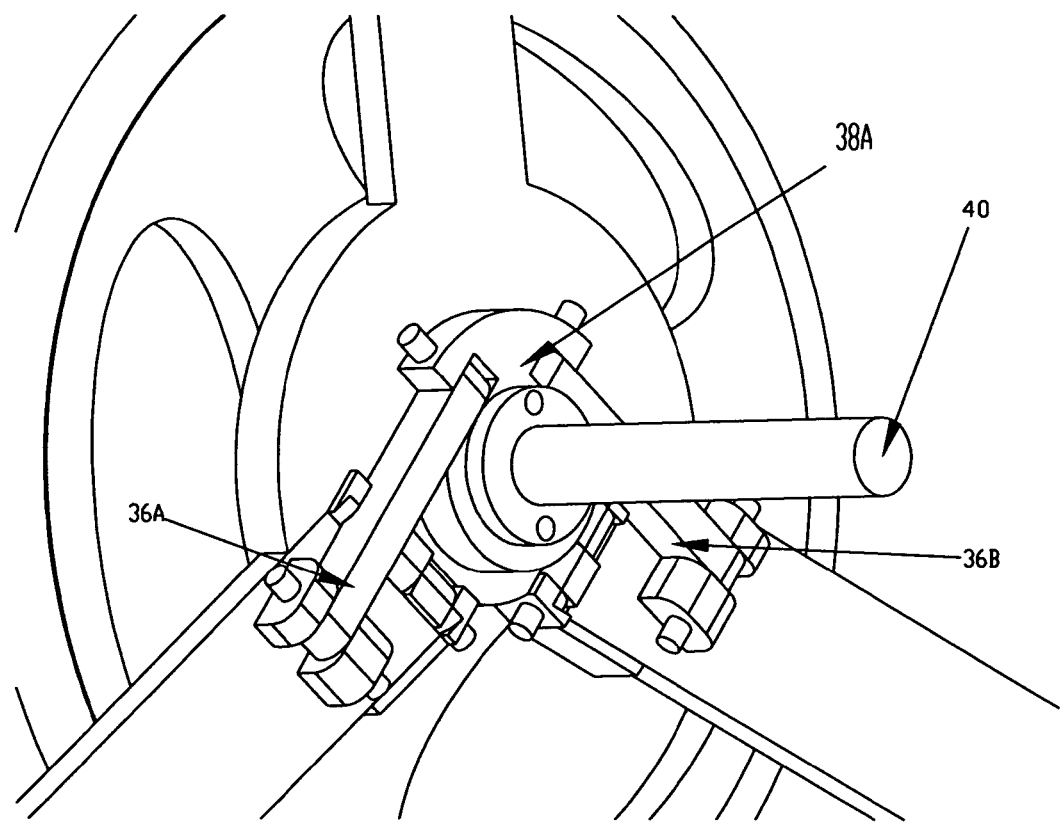
FIG. 4 is an isometric zoomed-in view of the foldable spider wheel apparatus as illustrated in FIG. 3 with parts 38B-38F removed for greater visibility.
Figure 5:
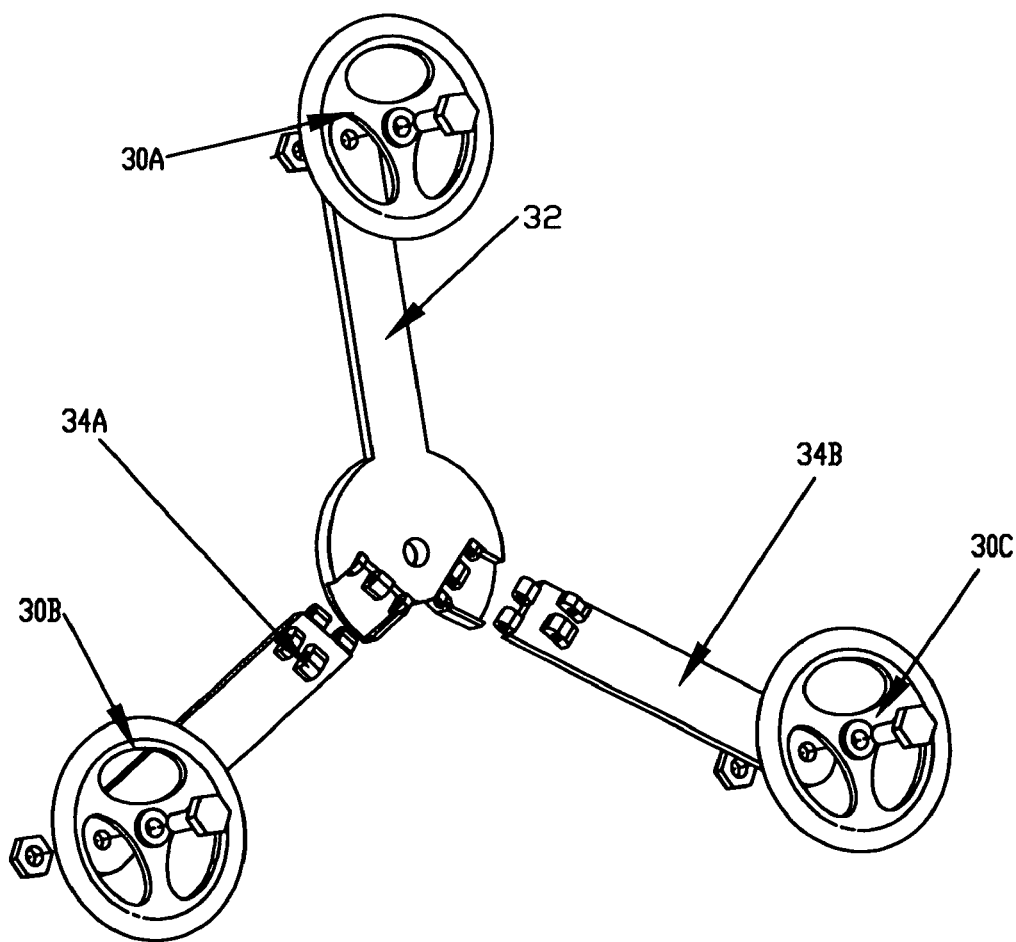
FIG. 5 is an isometric assembly view of the foldable spider wheel apparatus as illustrated in FIG. 3 and FIG. 4.
Figure 6:
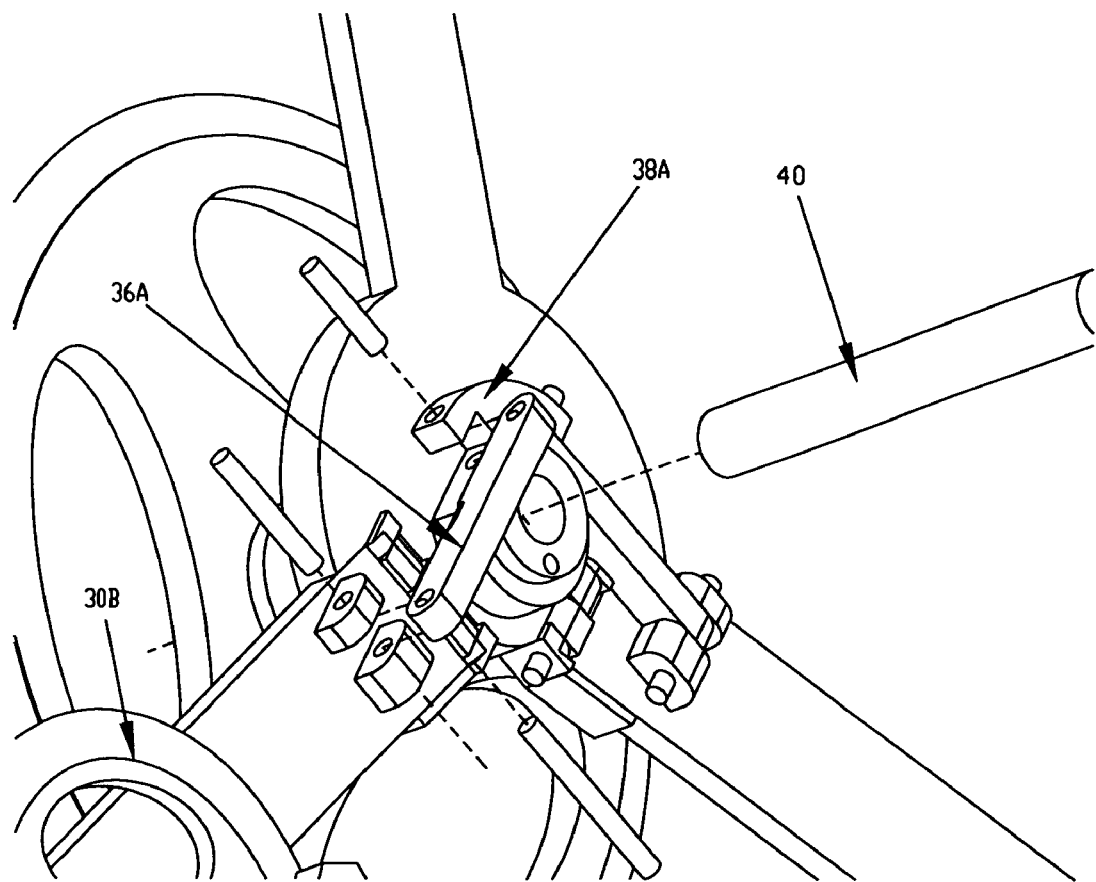
FIG. 6 is an isometric zoomed-in assembly view of the foldable spider wheel apparatus as illustrated in FIG. 3, FIG. 4, and FIG. 5.

Referring initially to FIG. 1 and FIG. 2, the preferred embodiment comprises protective shell 72 that encloses foldable spider wheel apparatus 29 leaving only wheels 30B and 30C exposed to roll freely along flat ground. Thus, 30-38 fold into protective shell 72, rendering foldable spider wheel apparatus 29 durable and portable, ideal for storage in a trunk or overhead luggage compartment. FIG. 2 reveals a view of foldable spider wheel apparatus 29 without protective shell 72 allowing for greater visibility. 30-38 are fastened to central shaft 40 that runs through body square angles 52A and 52B. Handle 58 telescopes up and down, sliding within square angle 52, and activates the folding mechanism via T-shaped motion translator 48 and rigid connecting arms 50. 30-38, central shaft 40, square angle 52, and handle 58 comprise the elements that give the main structural rigidity to foldable spider wheel apparatus 29.

The foldable spider apparatus is pictured in FIG. 3 through FIG. 6. Three small wheels 30A-C are fastened to the ends of legs 34A and 34B such that the wheels may freely rotate. Legs 34A and 34B are fastened with connecting arms 36 with back plate 32. Legs 34A and 34B are hinged to arm back plate 32 such that the hinges would meet at a right angle if extended, and that arm with back plate 32, leg 34A and leg 34B meet at 120° when laid in a single plane. Accordingly, leg 34A and leg 34B may rotate along their hinges to fold perpendicular to arm with back plate 32. Assembly is pictured in FIG. 5 and FIG. 6. Connecting arms 36 are hinged at one end to leg 34A, respectively, and to rotational rotary anchor 38A on the other end, such that the hinges lie parallel with each other. The assembly is rigidly fastened to central shaft 40.

Figure 7:
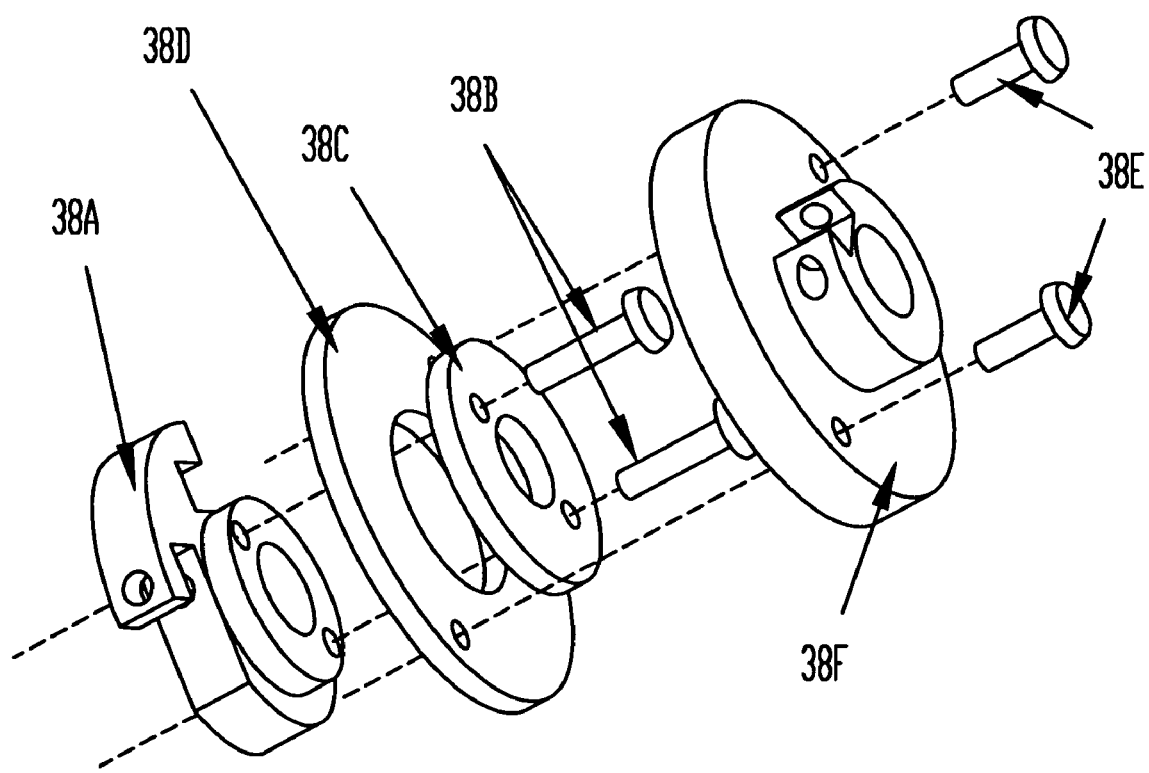
FIG. 7 is an isometric exploded view of rotational coupler, 38A-38F, as illustrated in FIG. 3.

The rotational coupler, 38A-38F is illustrated in FIG. 7. Fasteners 38B rigidly fasten rotational rotary anchor 38A to end piece 38C. Likewise fasteners 38E rigidly fasten rotational coupler 38D to coupler end piece 38F. 38D-38F, as assembled, fits around 38A-38C, such that 38D-38F may rotate freely, even when an axial thrust force is applied to 38A-38C. Such a thrust force causes the spider wheel to unfold. In this situation, any force directed radially inward on legs 34A or 34B to fold in is redirected through connecting arm 36 and exerts a thrust force on 38A-38C, radially inward on central shaft 40. Despite large forces directed on legs 34A and 34B, to fold in, the unit remains locked in the unfolded position due to the geometry of leg 34A, leg 34B and connecting arms 36A and 36B lying flush against one another in a single plane. Thus formed, rotary coupler 38D-38F remains freely rotating around anchor 38A-38C, so that the spider wheel apparatus may rotate around central shaft 40 without rotating rigid connecting arms 50 that keep the spider apparatus unfolded remaining fastened to the body 52.

Figure 8:
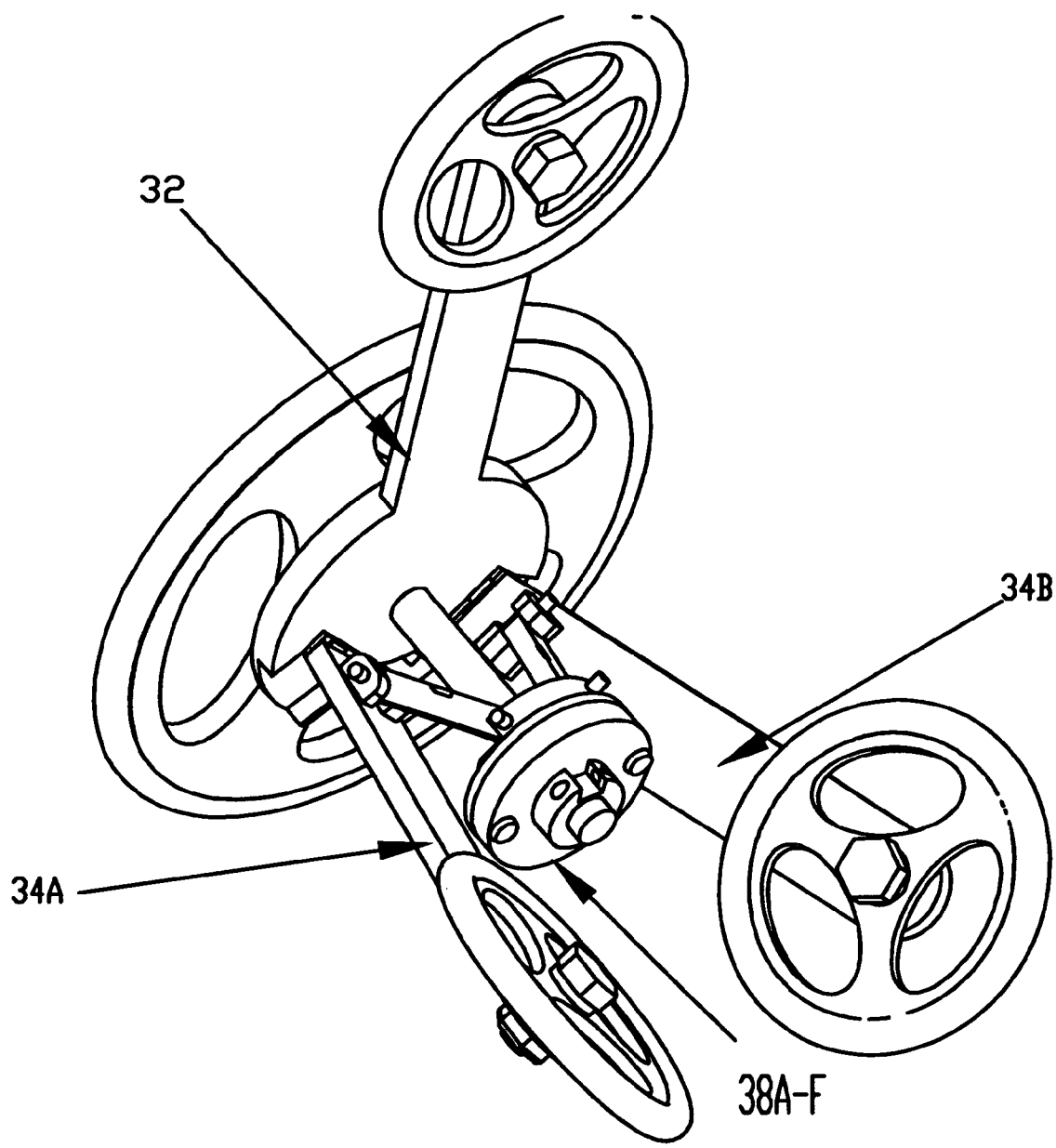
FIG. 8 is an isometric view of the foldable spider wheel apparatus being configured for a closed position, configured for portability.
Figure 9:
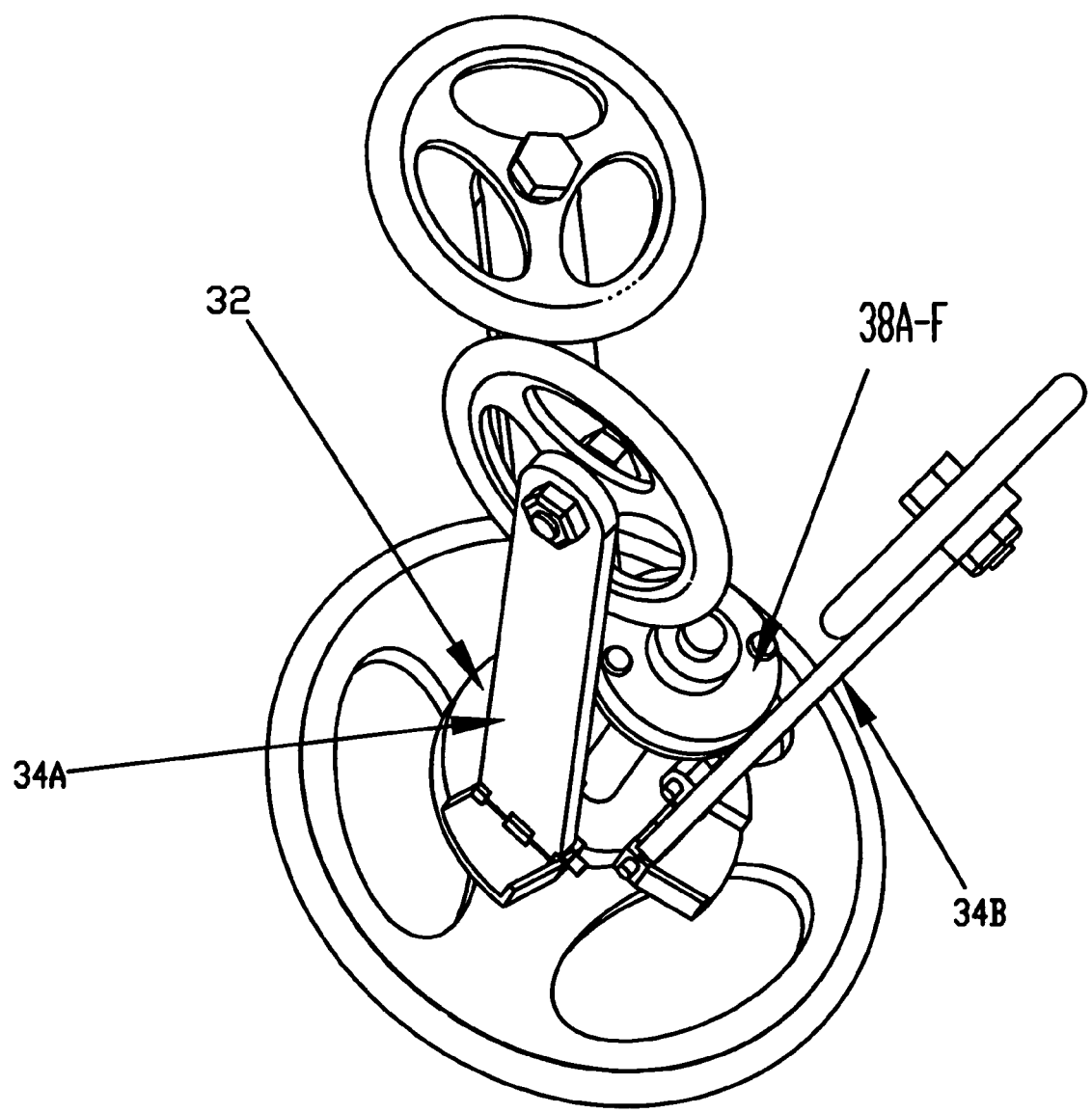
FIG. 9 is an underside isometric view of the foldable spider wheel apparatus being configured for a closed position, configured for portability, as illustrated in FIG. 8.

Accordingly, the spider apparatus (30-38), once unfolded, is equivalent to a standard rigid spider wheel assembly with a set of three spokes with three small freely-rotating wheels on each end that is effective for both flat surfaces and for climbing stairs by rotating around central shaft 40. The legs may fold in, as pictured in FIG. 8 and FIG. 9. As legs 34A and 34B rotate perpendicularly to arm with back plate 32 along a hinge, connecting arms 36A and 36B also rotates along its hinges, and 38A-38F slides along central shaft 40. Thus, the folding/unfolding motion is similar to that of a folding umbrella. The design of the spider assembly as mentioned requires minimal force exerted by the user to actuate folding and unfolding.

Figure 10:
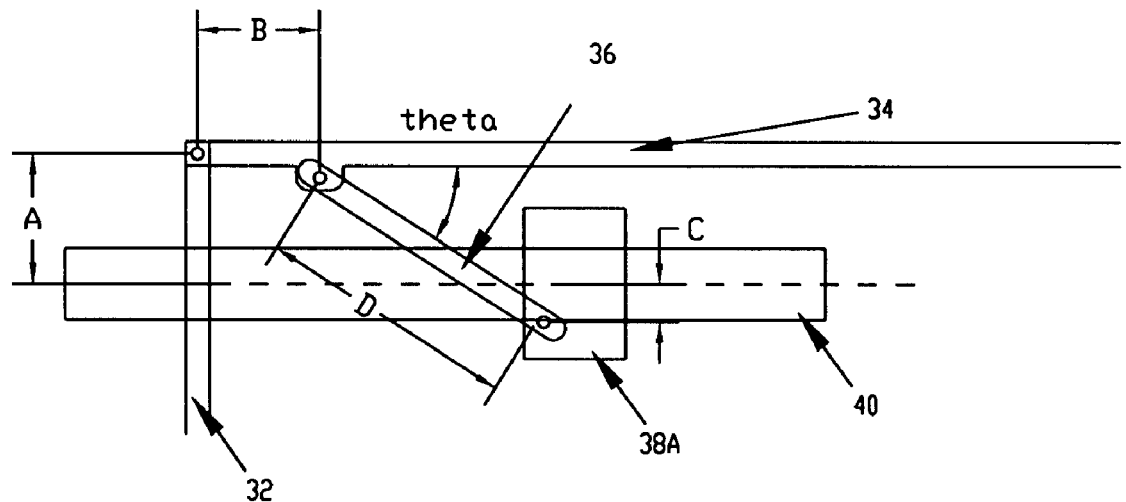
FIG. 10 is a side elevation view of the spider assembly being configured for a folded position.
Figure 11:
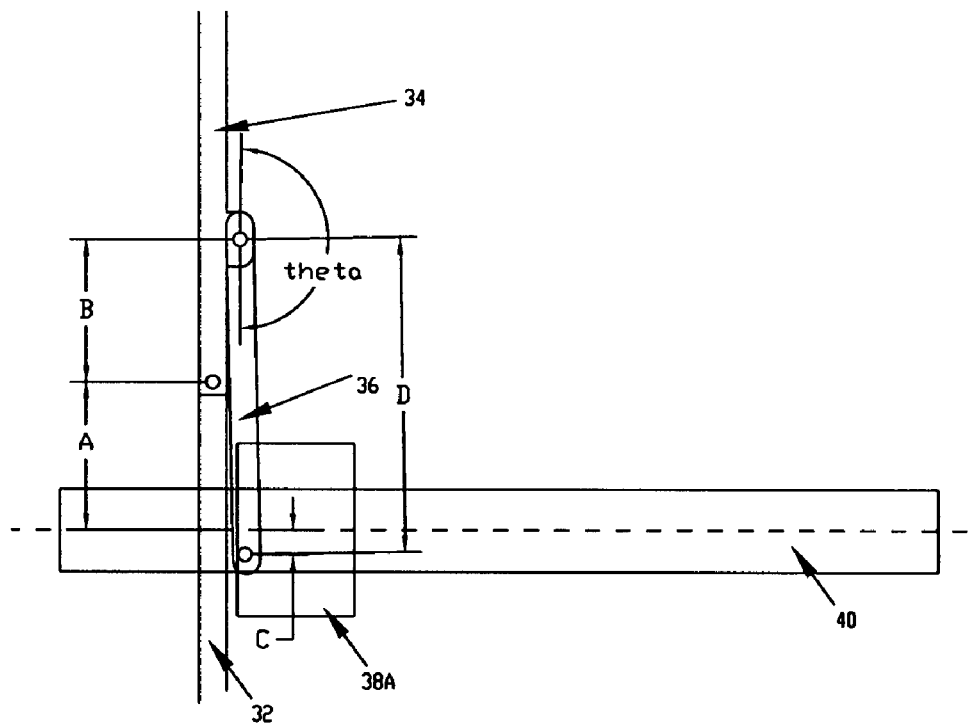
FIG. 11 is a side elevation view of the spider assembly being configured for an open position.
Figure 13:
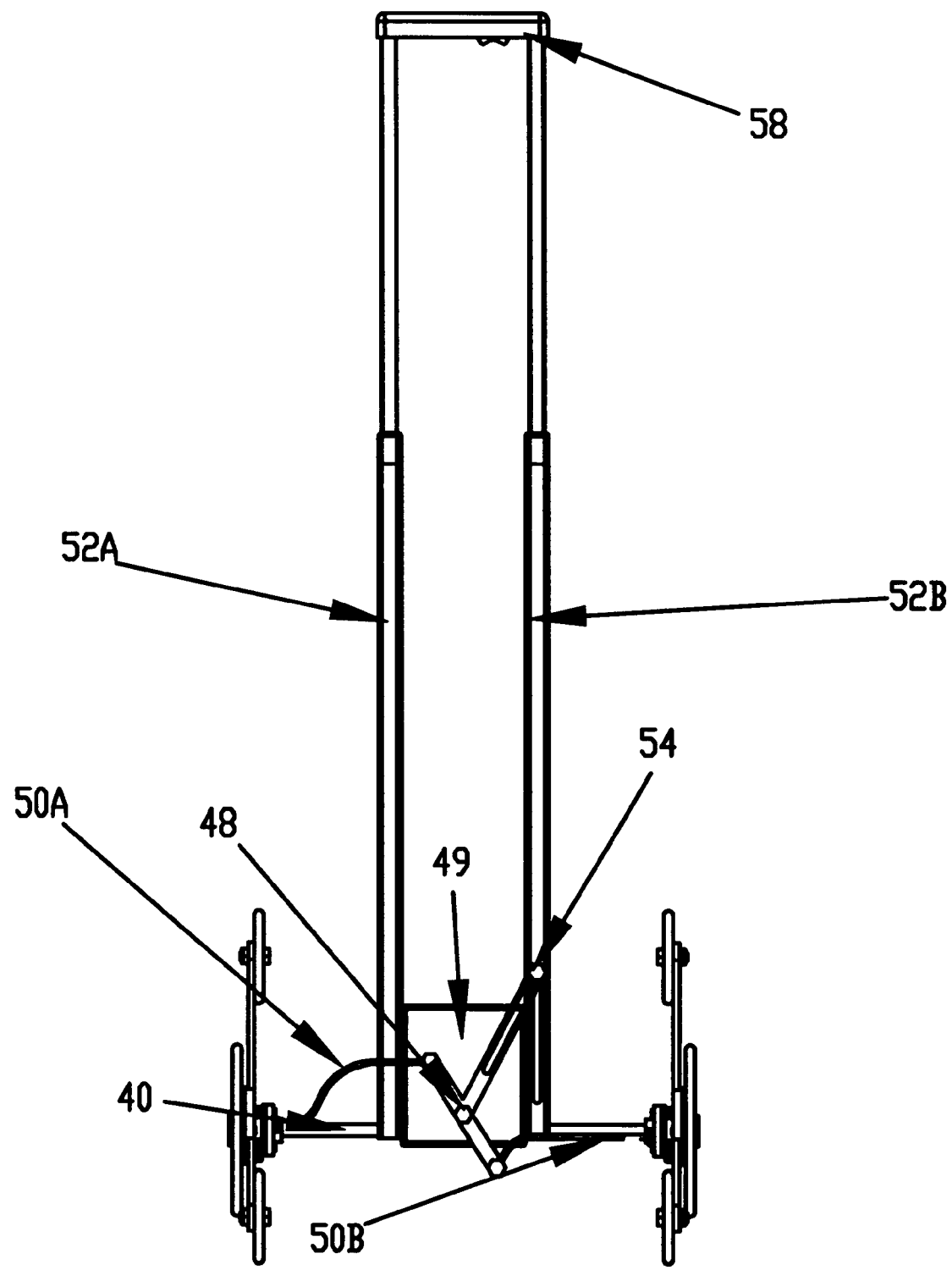
FIG. 13 is a front elevation view of the telescoping handle folding mechanism being configured for an open position, configured for travel.
Figure 14:
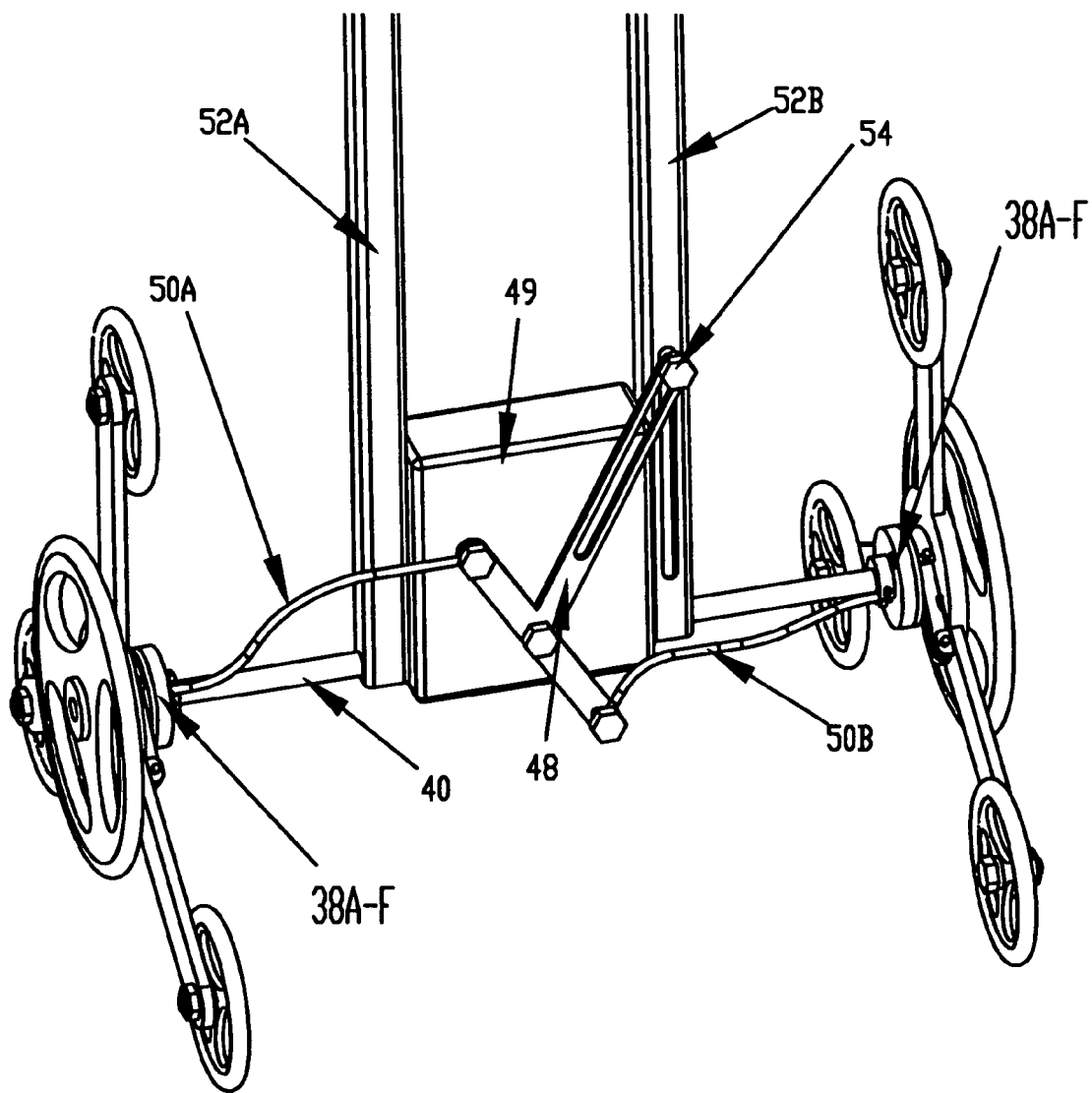
FIG. 14 is an isometric view of the telescoping handle folding mechanism being configured for an open position, configured for travel.
Figure 15:
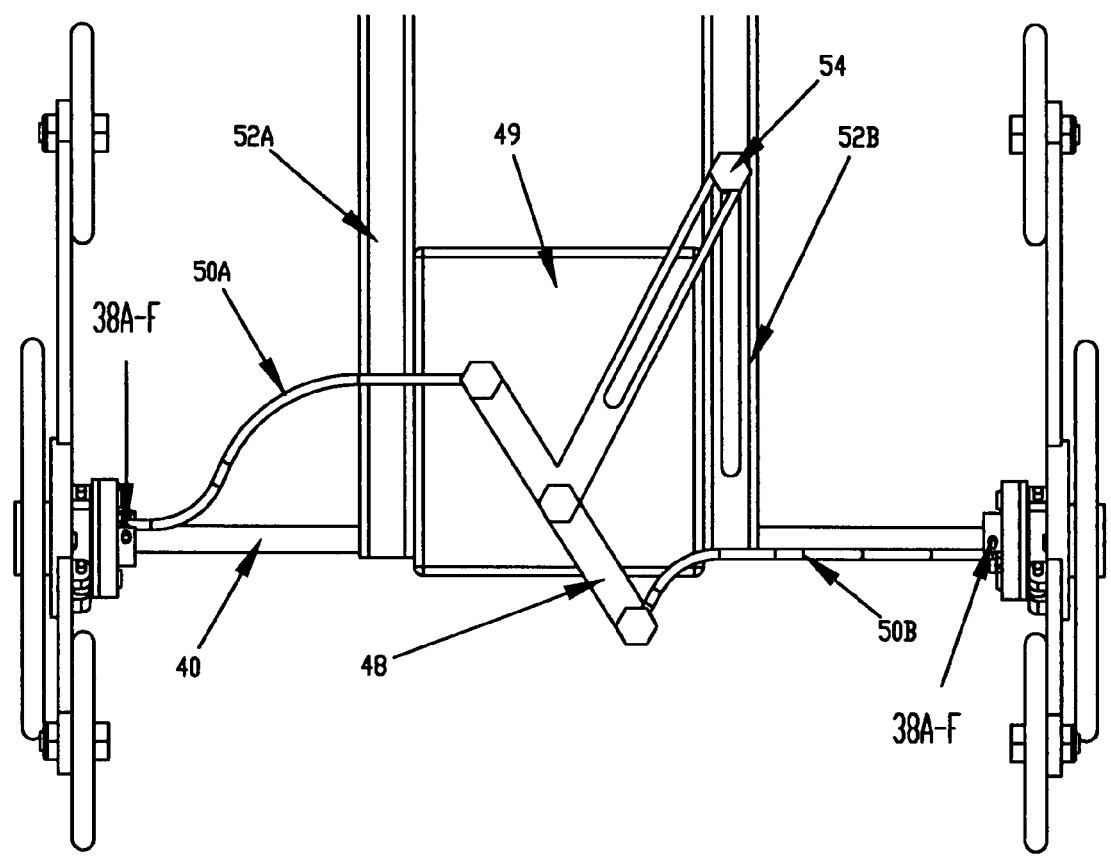
FIG. 15 is a zoomed-in front elevation view of the telescoping handle folding mechanism being configured for an open position, configured for travel as illustrated by FIG. 14 and FIG. 13.
Figure 16:
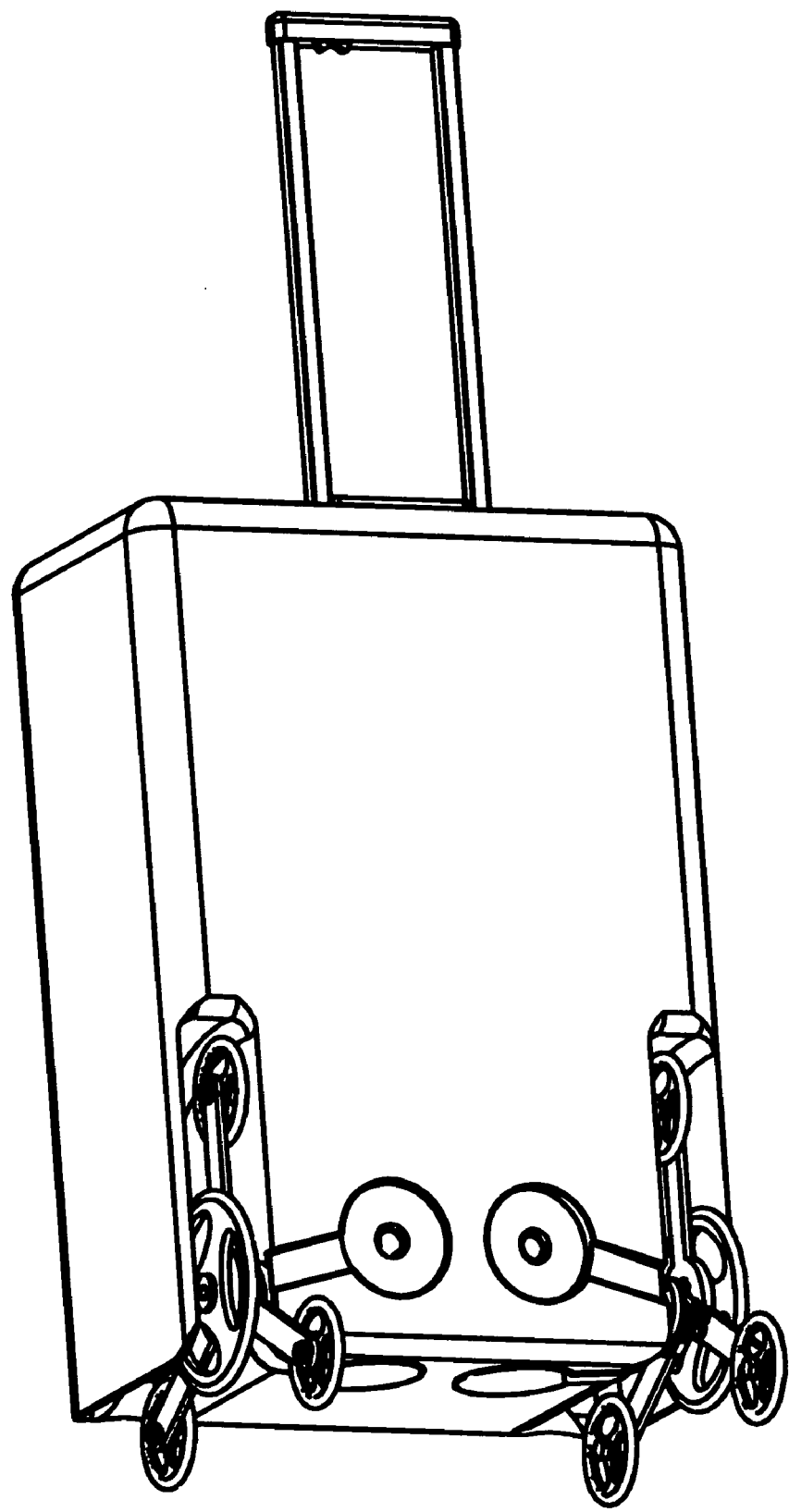
FIG. 16 is an isometric view of the telescoping handle folding mechanism being configured for an open position with protective shell being shown.
Figure 17:
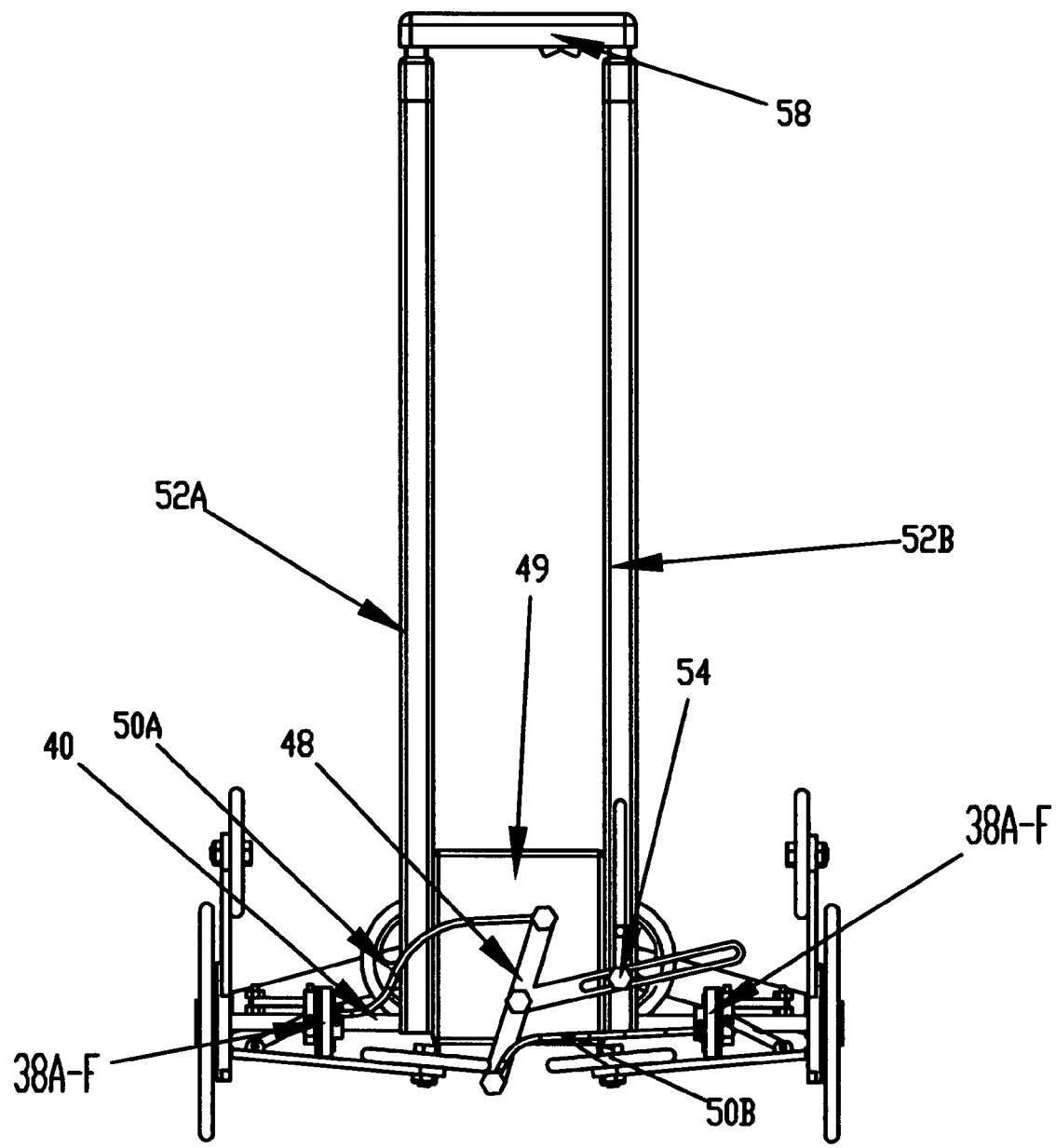
FIG. 17 is a front elevation view of the telescoping handle folding mechanism being configured for a closed position, configured for portability.
Figure 18:
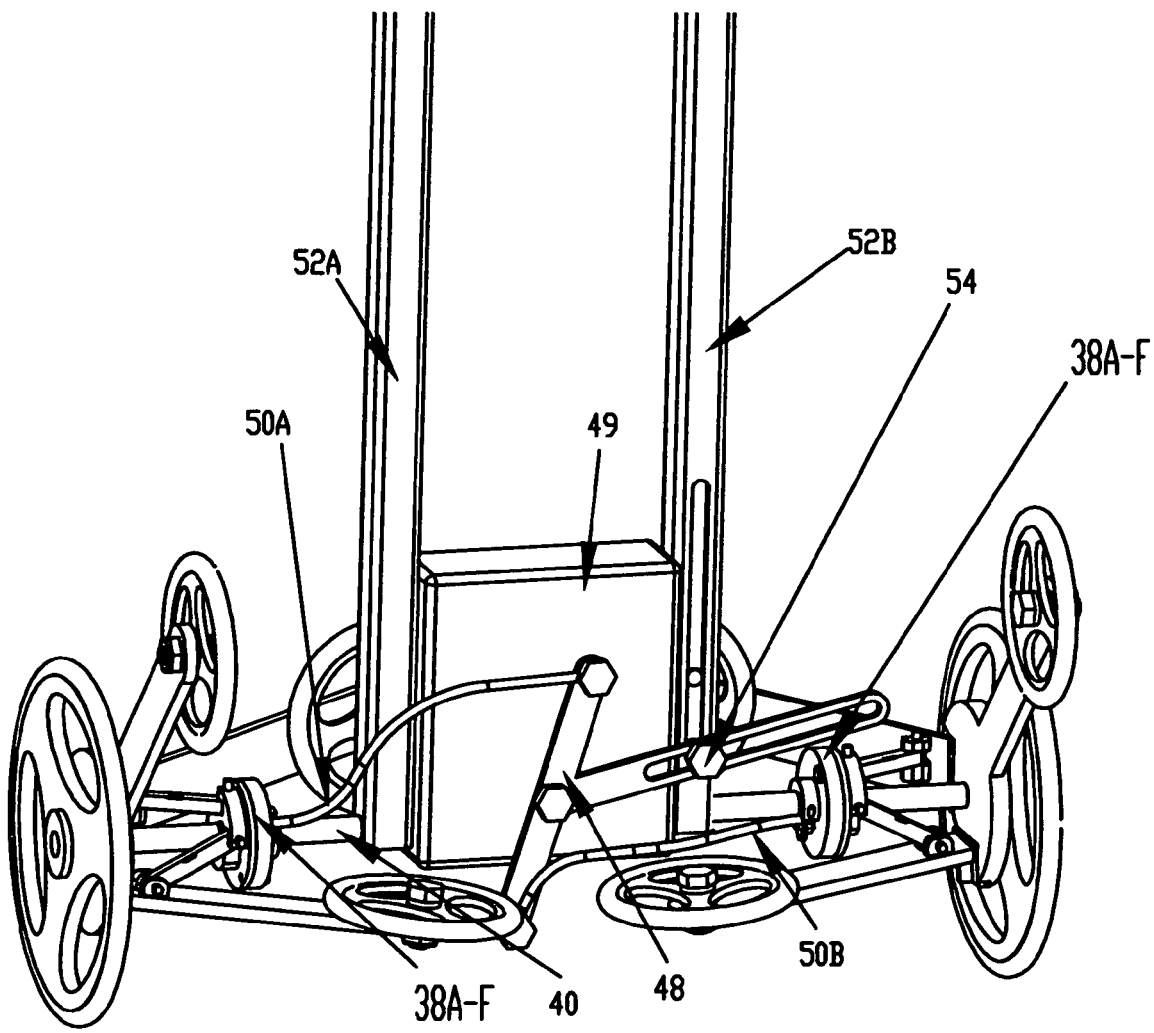
FIG. 18 is an isometric view of the telescoping handle folding mechanism being configured for a closed position, configured for portability as illustrated by FIG. 17.
Figure 19:
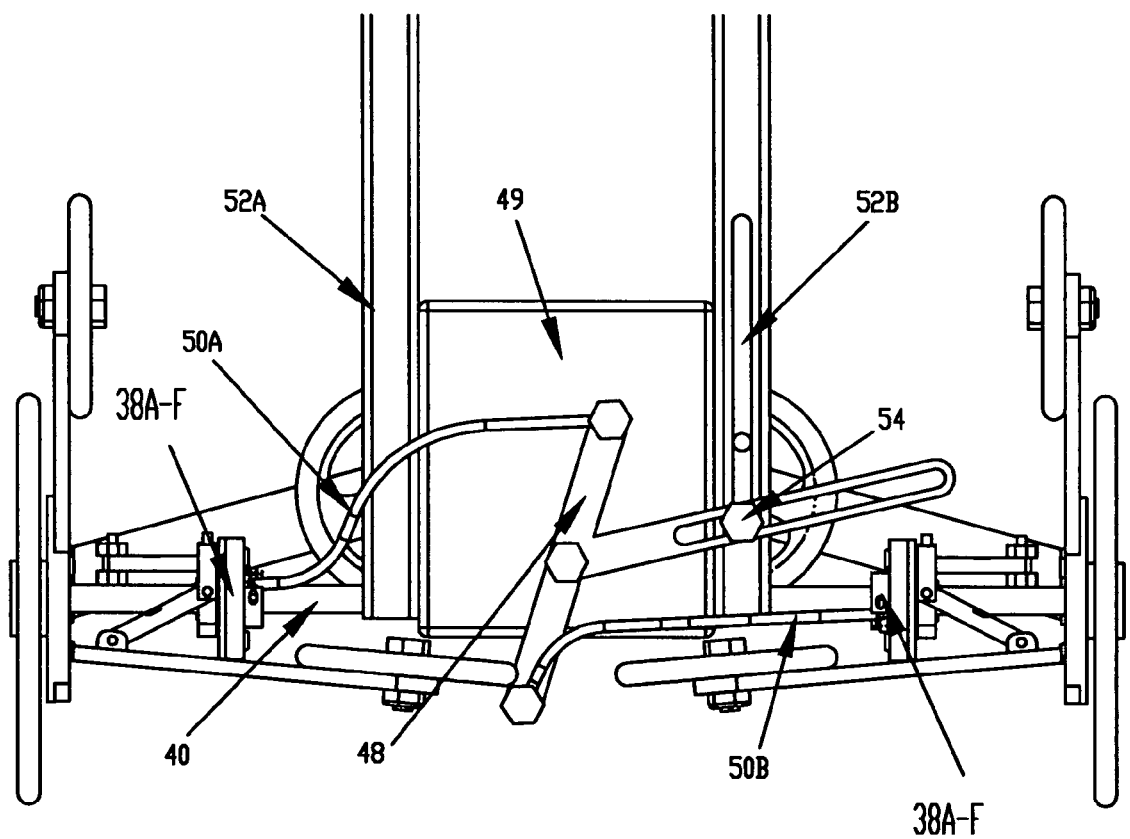
FIG. 19 is a zoomed-in front elevation view of the telescoping handle folding mechanism being configured for a closed position, configured for portability as illustrated by FIG. 17 and FIG. 18.
Figure 20:
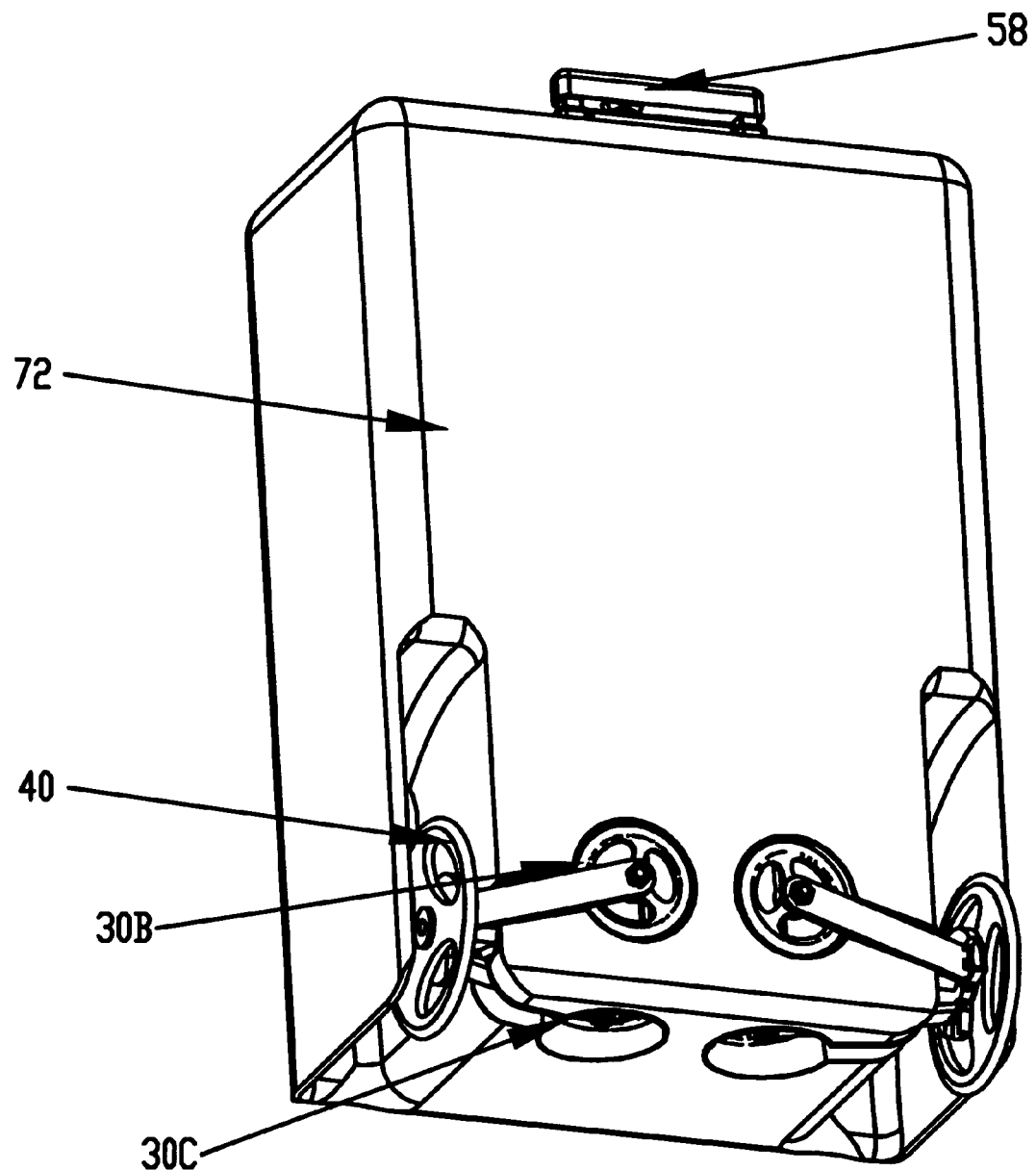
FIG. 20 is an isometric view of the telescoping handle folding assembly being configured for a closed position, with protective shell being shown.

Alternative embodiments of an umbrella-like folding mechanism can also extend and retract the spider wheels. However, the geometry of the preferred embodiment is such that the spider assembly locks in position with a small user-applied force, does not collapse under large forces on the wheels, and unlocks and folds with minimal user-applied force. The distinguishing characteristic of this geometry lies in the fact that connecting arms 36A and 36B lies parallel with legs 34A and 34B in the open position, and thus, any external force on radial coupler 38A-38F is directed radially inward on central shaft 40, preventing accidental folding of the assembly. This radial force can easily be opposed by central shaft 40 only if connecting arms 36A and 36B and legs 34A and 34B lie parallel in the closed position. Thus, external forces will not push the wheels out of their locked state. The geometry of the assembly is depicted in FIG. 10, FIG. 11, and FIG. 12.

In addition, varying the length of connecting arms 36A and 36B and the location of holes on legs 34A and 34B and on rotary anchor 38A, the geometry of the folding mechanism can be adjusted. By changing the lengths and positions of connecting arms 36A and 36B and the hinges on legs 34A and 34B, the angle between the connecting arms 36A and 36B and legs 34A and 34B can be varied, in order to reduce the necessary force required to open the spider from the closed position. If the angle theta is too shallow, an axial force to push rotary coupler 38A-38F along central shaft 40 becomes too large to open the assembly. Thus, a near-optimal set of distances to achieve a large enough angle theta and adequate travel for 38A-38F along central shaft 40 is set in bold in FIG. 12. The column labeled 'suboptimal gap' computed in FIG. 12 is the difference of theta and 45°. Theta equaling 45° provides connecting arms 36A and 36B with the optimal mechanical advantage to open legs 34A and 34B from closed position, so the preferred embodiment minimizes the suboptimal gap as well as rendering the travel distance for radial coupler 38A-38F within the design constraints so that 38A-38F does not collide with body angle 52.

Activation of Folding and Unfolding

The folding motion of the aforementioned spider assembly is activated by the user via telescoping the carrying handle 58 in the case of storing foldable spider wheel apparatus 29 for portable transport. Telescoping handle 58 additionally folds in the spider assembly. Referring to FIG. 13 through FIG. 16 illustrate various views of the suitcase with spider wheels completely unfolded, i.e. extended and ready to traverse terrain. Rotary couplers 38A-38F on the aforementioned spider assembly are hinged to rigid connecting arms 50 that are in turn fastened to T-shaped motion translator 48. T-shaped motion translator 48 is fastened in through its center to motor drive system 49 that is rigidly fastened to square angle 52. Thus, T-shaped motion translator 48 may freely rotate around its center axis. T-shaped motion translator 48 includes a protruding arm with a vertical sliding channel in it, through which inner sliding angle 54 is fastened.

To unfold the spider assembly 30-38 for use, the user lifts handle 58 vertically. This lifts inner sliding angle 54, to which handle 58 is fastened, which slides within square angle 52. Lifting inner sliding angle 54 causes T-shaped motion translator 48 to rotate counter-clockwise, as pictured in FIG. 15, which rotates rigid connecting arms 50 outward, pressing on 38A-38F in an outward direction on central shaft 40. This happens on both the left and right spider wheel assemblies, causing both to unfold into fully extended positions.

To fold the spider assembly 30-38, for portability, the user presses handle 58 down vertically, activating the reverse process. The folded in position is illustrated in FIG. 17 through FIG. 20. Inner sliding angle 54 then moves downward within square angle 52, causing T-shaped motion translator 48 to rotate clockwise, as pictured in FIG. 19, which rotates rigid connecting arms 50 inward, pulling 38A-38F inward on central shaft 40, causing both left and right spider wheel assemblies to fold in. Accordingly, protective shell 72 has depressions on its bottom and back sides allowing the arm and wheels, 30 and legs 34A and 34B, to fit within the shell and lie flush against the back and bottom, as pictured in FIG. 16 and FIG. 20.

Thus, a complete fold-in, fold-out-lock mechanism is achieved that is operated by a simple pushing down and pulling up of the telescoping handle 58 on the main body.

ADVANTAGES

Accordingly, it is the object of this invention to enable a towing device's spider assembly to fold into a protective enclosure enhancing portability and durability overall. In addition, several objects and advantages of this invention are:

a.) to introduce a collapsible spider wheel apparatus for portability;

b.) to allow the locking of the spider wheel in open position requiring an asymmetrically low input force from the user;

c.) to allow for the central driveshaft to rotate while the spider wheel remains in a locked open position; and d.) to enable the user to actuate the fold-in, fold-out mechanism through the normal handle telescoping motion of an embodiment such as a suitcase.

While the invention has been described with reference to the preferred embodiment thereof, it will be appreciated by those of ordinary skill in the art that modifications can be made to the structure and elements of the invention without departing from the spirit and scope of the invention as a whole.

Alternative Embodiments

The third arm of the spider folding apparatus may also fold in a similar manner, along with the other two arms. Thus, arm with back plate 32 could be appropriately hinged as are legs 34A and legs 34B such that all three arms fold in when 38A-38F moves inward.

Figure 21:
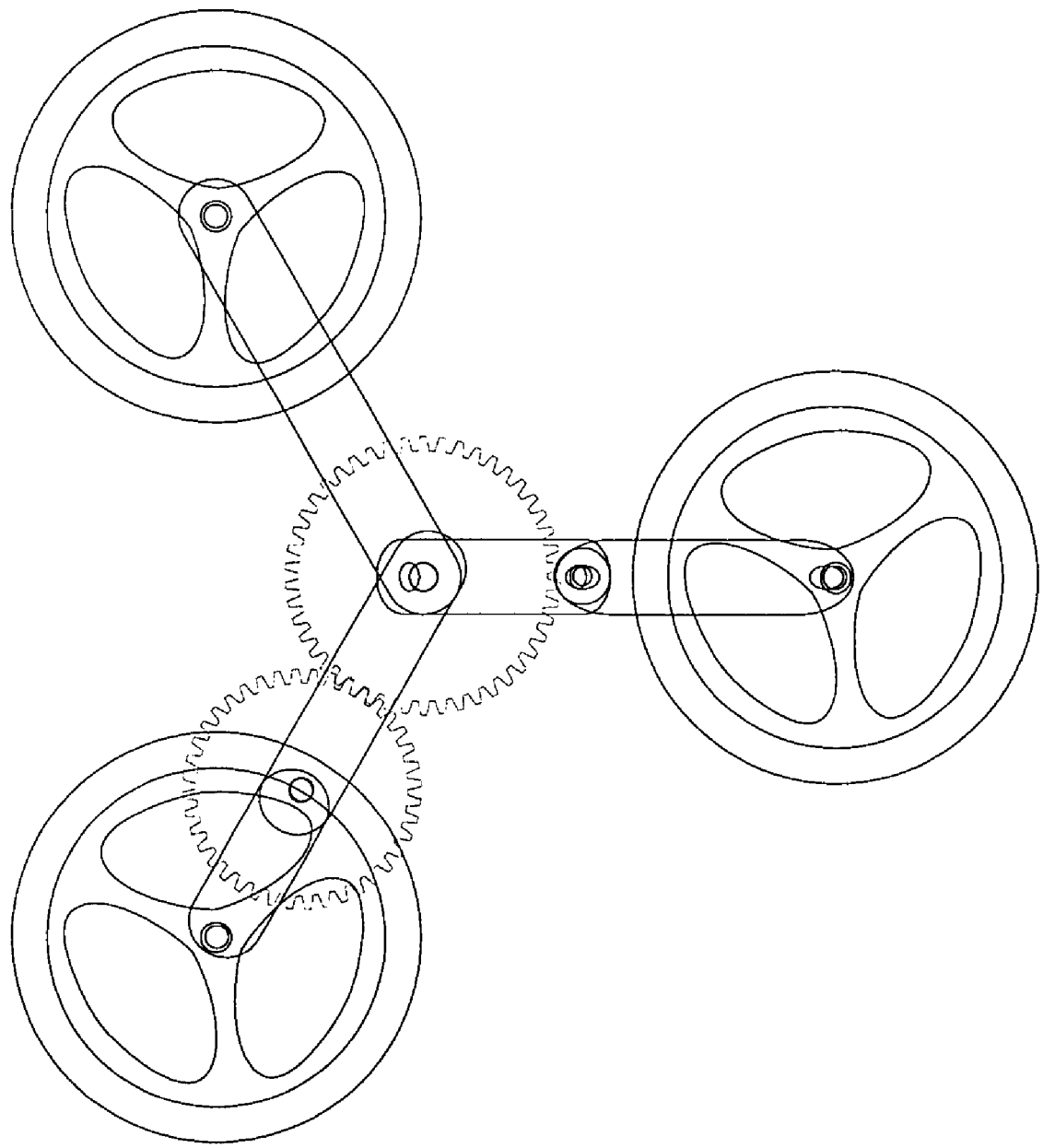
FIG. 21 is a front elevation illustration of an alternative embodiment for the spider folding assembly in the open position.
Figure 22:
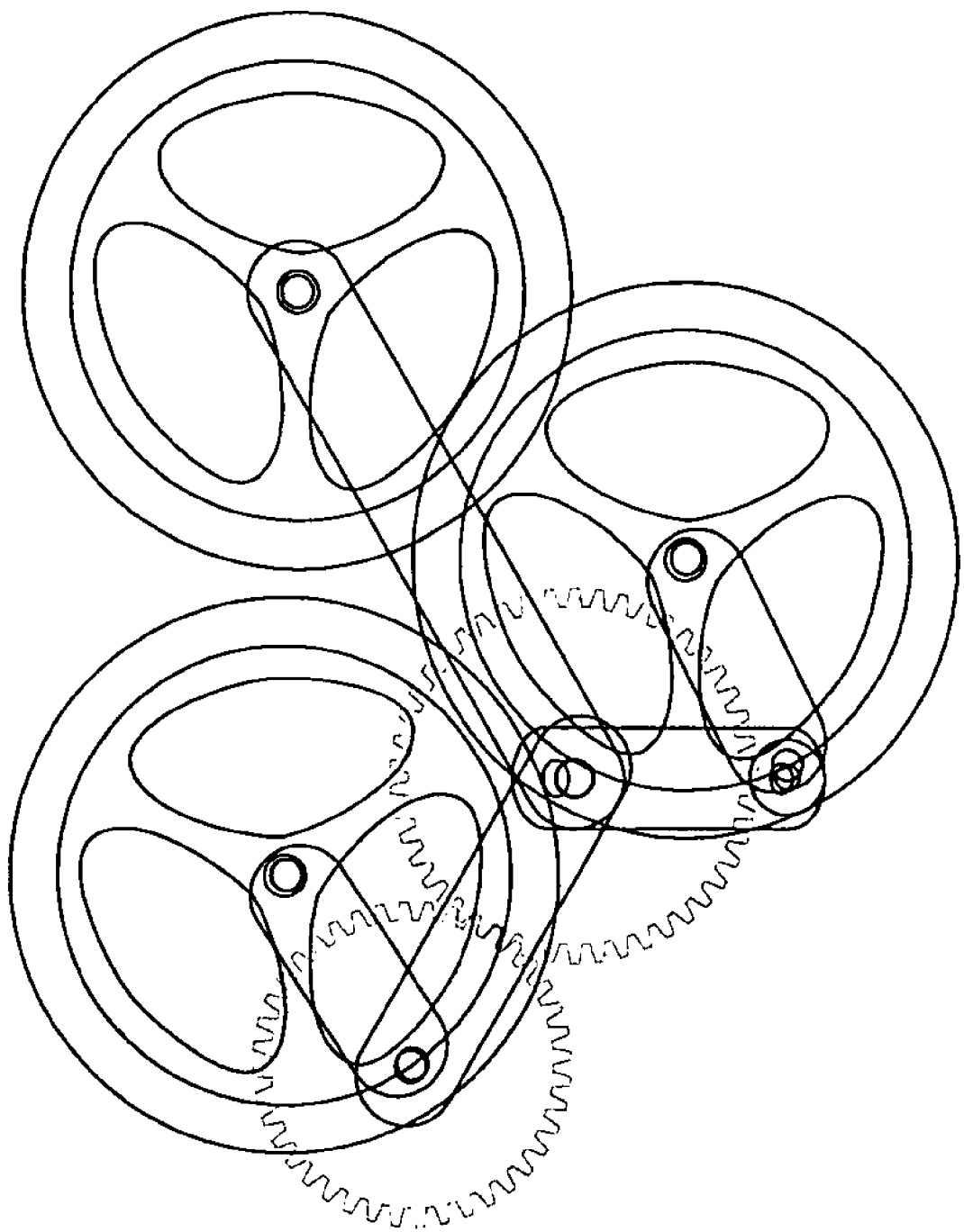
FIG. 22 is a front elevation illustration of an alternative embodiment for the spider folding assembly in the folded position.

Another method to collapse the spider apparatus includes rendering each leg 34A and leg 34B broken in the middle but freely rotating perpendicular to the direction of that of the preferred embodiment. Thus, each leg 34A and leg 34B swivels inwards toward the middle, with assistance from gears that are fastened to each side of leg 34A and leg 34B. An illustration is provided in FIG. 21 and FIG. 22.

Another method of folding the spider apparatus includes screwing each of the three arms of the spider apparatus onto central shaft 40, which is threaded very coarsely, with a large pitch such that the arms will rotate when pushed axially, but will not move axially when rotated. With a small amount of movement in the axial direction, two of wheels 30A and 30B will rotate 120 degrees and 240 degrees, respectively, to stack all of the wheels collinearly for easy storage. The two positions, folded and unfolded, may be controlled by a single motion of a spring-loaded lever that pushes and pulls the spider arms along the driveshaft.

Yet another method of folding in the spider apparatus is allowing the entire assembly, 30-38 with central shaft 40 to lie on a track that may shift into the central protective enclosure. Thus, the wheel fixture may be translated upward so that it does not protrude from the front of the body, protective shell 72.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A collapsible spider assembly comprising:
    a central driveshaft coupled to a towing device;
    a spider assembly coupled to an end of said driveshaft;
    means for collapsing said spider assembly; and
    a handle mounted on said towing device, said handle activating said means for collapsing said spider assembly for providing folding and/or unfolding of said spider assembly in a one-step push-pull procedure.

2. The apparatus of claim 1 wherein said hinged arms are fastened to a rotary coupler on the central driveshaft, said rotary coupler being activated by said handle to activate folding when pushed in and out along said shaft.

3. The apparatus of claim 2 wherein said rotary coupler allows for rotation of said central driveshaft while said spider assembly remains locked in the open position.

4. The apparatus of claim 2 wherein said spider assembly comprises a plurality of wheels, at least one of said wheels are coupled to a leg, said leg is fastened to a back plate with said hinged arm.

5. The apparatus of claim 4 wherein said length of said hinged arms provides fastening of said hinged arms to said legs are selected to provide a hinged suboptimal gap.

6. The apparatus of claim 4 comprising three wheels and each of said wheels are fastened to said back plate with said hinged arm.

7. The apparatus of claim 2 wherein said means for collapsing said assembly further comprises a T-shaped motion translator coupled to said rotary coupler, said T-shaped motion translator includes a protruding arm with a vertical sliding channel, a sliding angle slides in said sliding channel and said sliding angle is coupled to said handle wherein lifting said sliding angle causes said T-shaped motion translator to rotate counterclockwise and pressing said rotary coupler in an outward direction.

8. The apparatus of claim 2 wherein said means for collapsing said spider assembly comprises swiveling said wheels using at least one gear.

9. A collapsible spider assembly comprising:
    a central driveshaft coupled to a towing device;
    a spider assembly coupled to an end of said driveshaft; and
    means for collapsing said spider assembly;
wherein the means for collapsing said assembly comprises hinged arms attached to said spider assembly, said hinged arms rotating inwardly toward said central driveshaft.

10. The apparatus of claim 9 wherein said hinged arms of said spider assembly can lock into an open position.

11. A collapsible spider assembly comprising:
    a central driveshaft coupled to a towing device;
    a spider assembly coupled to an end of said driveshaft; and
    means for collapsing said spider assembly;
wherein said spider assembly can collapse into a body of said towing device such that no portion of said spider wheel assembly protrudes from the body of said towing device.

* * * * *